Figure 1:
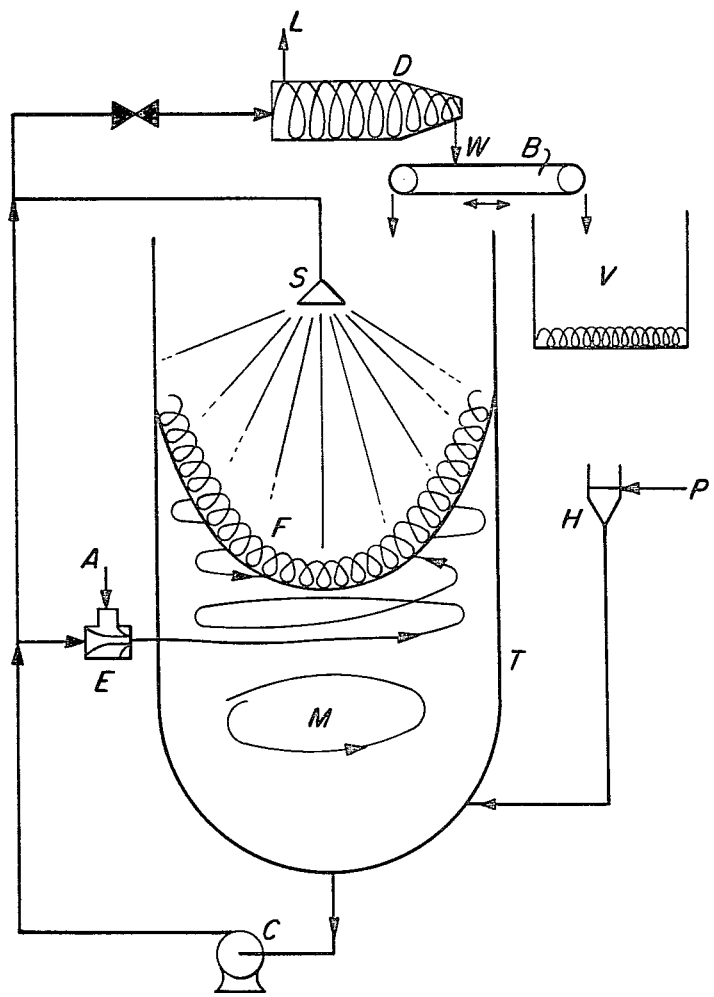

United States Patent [19]
Chaikin et al.

[11] 4,244,815
[45] Jan. 13, 1981

[54] PROCESS AND APPARATUS FOR THE AEROBIC BIOLOGICAL PURIFICATION OF LIQUID WASTES CONTAINING ORGANIC POLLUTANTS

[75] Inventors: Malcolm Chaikin, Centennial Park; John R. McCracken, Kareela, both of Australia

[73] Assignee: Unisearch Limited, Kensington, Australia

[21] Appl. No.: 9,970

[22] Filed: Feb. 6, 1979

Related U.S. Application Data

[63] Continuation of Ser. No. 769,730, Feb. 17, 1977, abandoned.

[30] Foreign Application Priority Data

Feb. 27, 1976 [AU] Australia .............................. PC5025

[51] Int. Cl.³ .............................................. C02F 3/20
[52] U.S. Cl. ................................ 210/622; 210/195.3; 210/197; 210/628
[58] Field of Search ...................... 210/7, 13, 14, 197, 210/15, 512 R, 4, 6, 195.3, 220

[56] References Cited

U.S. PATENT DOCUMENTS

| 3,220,706 | 11/1965 | Valdespino | 210/512 R |
| 3,271,304 | 9/1966 | Valdespino et al. | 210/220 X |
| 3,371,033 | 2/1968 | Simmons et al. | 210/14 |
| 3,390,076 | 6/1968 | DuBach | 210/13 |
| 3,448,044 | 6/1969 | Garrett | 210/13 |
| 3,772,187 | 11/1973 | Othmer | 210/220 X |
| 3,959,124 | 5/1976 | Tchobanoglous | 210/6 |

Primary Examiner—Thomas G. Wyse
Attorney, Agent, or Firm—Toren, McGeady and Stanger

[57] ABSTRACT

A process and apparatus for the purification of effluent waters containing organic pollutants by a rapid biological oxidation (activated sludge) process characterized in that the liquid to be purified is introduced into a tank containing a liquid having a high biomass concentration. Liquid is drawn from the tank and reintroduced through an aerating device in such a way as to produce rotation of the liquid in the tank to the extent that a vortex is produced on the surface. A part of the liquid taken from the tank is strayed on to the vortex and a proportion passed to a mechanical separating means that separates sludge from the liquid and a proportion of the separated sludge is reintroduced directly in to the tank. The liquid from which the sludge has been removed constitutes the purified effluent.

6 Claims, 1 Drawing Figure

PROCESS AND APPARATUS FOR THE AEROBIC BIOLOGICAL PURIFICATION OF LIQUID WASTES CONTAINING ORGANIC POLLUTANTS

This is a continuation of application Ser. No. 769,730, filed on Feb. 17, 1977, abandoned.

This invention relates to a process and apparatus for the purification of effluent waters containing organic pollutants by a rapid biological oxidation (activated sludge) process.

One object of the invention is to provide a process and apparatus of high efficiency with small operating and capital costs. Further objects are: to avoid the usual problems with compressors and air filters; to increase the efficiency of dissolution of oxygen from air in the liquor due to pressure, dispersion, and interfacial area between air and liquor; to increase the concentration of microorganisms and hence rate of biodegradation of the organic pollutants; to utilise the energy of pumping the fluids and excess energy of biodegradation to increase the kinetic rate of biological activity; to overcome the problem of bulking sludge; to deliver from the process a partially dewatered sludge suitable for disposal by digestion, dumping, composting, incineration or by other means.

The invention consists in apparatus for the aerobic biological purification of liquid wastes containing organic pollutants comprising a tank containing a liquid having a high biomass concentration, means to introduce a liquid to be purified into said tank, pump means arranged to withdraw liquid from near the bottom of said tank, a fluid flow connection from said pump means to eductor means arranged to entrain air into said liquid, means to introduce said aerated liquid into said tank to cause a rapid circulatory movement of liquid in said tank and to produce a vortex at the surface thereof, spray means connected to the output of said pump to spray liquid onto said vortex, liquid metering means arranged to feed a predetermined proportion of said liquid to mechanical separating means arranged to separate out sludge from said liquid and means for introducing a proportion of said separated sludge directly into said tank.

The invention further consists in a process for the aerobic biological purification of liquid wastes containing organic pollutants comprising the steps of introducing a liquid waste to be purified into a tank containing a liquid having a high biomass concentration, withdrawing liquid from said tank aerating said liquid and reintroducing it into said tank the aerated liquid being introduced into the tank in such a manner as to cause liquid in said tank to circulate rapidly to produce a vortex at the surface of said liquid, spraying liquid from said tank onto the surface of said vortex, withdrawing liquid from said tank and treating said last mentioned liquid in mechanical separating means arranged to separate sludge from said liquid and returning a proportion of said sludge directly into said tank.

One feature of the invention relates to the aeration of a mixture of a concentrated source of microorganisms with the polluting stream by pumping the mixture through one or more eductors so as to entrain air into a tall column(s) or tank whereupon the air disperses as tiny bubbles throughout the mixture. The dispersion and pressure of pumping provides a means of efficient mixing and intimate contact and transfer of oxygen from air to liquor. The tiny bubbles of air gradually coalesce to form large bubbles but can be controlled by the addition of a high foaming surface active compound (if it isn't already in the polluting stream) whereby the air continues to be encased by the liquor upon leaving the liquor in the form of a foam. The level of foam is controlled by spraying it with some of the liquor from the same source of pumping through the eductors and by creating a vortex by tangetial entry of the mixture from the eductors which expels air by virtue of the resulting gravitational forces. The spray also contributes to efficient aeration of the liquor due to the large specific surface of the spray droplets. The large shear forces experienced by the biological floc in the eductors and in pumping permit a temporary disruption of the microorganisms and other suspended matter from the floc thus increasing the oxygen and substrate concentration gradients between microorganisms and liquor. The use of eductors and spray in this manner avoids the use of expensive air compressors and the usual ancillary air filtration equipment. Furthermore, the heat generated in pumping the mixture through the eductors and the excess energy from the aerobic biological activity can be utilised to increase the temperature and consequently to increase biological activity and this is particularly relevant in the colder climatic regions. (In most aeration processes of biological treatment the efficiency of oxygen transfer is low and many times the actual air required is pumped through the mixed liquors and this tends to cool the liquors because of evaporation thus decreasing biological activity. Also considerable loss of energy occurs in the air compression operation adding to operating costs).

A further feature of the invention relates to the maintaining of a high concentration of microorganisms in contact with the pollutant source by recycling a portion of the largely dewatered biological floc directly from a centrifugal decanter or other mechanical concentrator back into the aerated liquor. The microorganism population should be kept as high as possible to maintain a high rate of biodegradation of the organic pollutants which results in smaller equipment and capital cost. The limitation on further concentrating the biological floc is the increase in viscosity realised which ultimately reduces the pumping and mixing characteristics of the liquor affecting, in particular, the oxygen transfer from air to solution and then to each microorganism. A particularly beneficial result of directly recycling the sludge from the centrifugal decanter or other mechanical concentrator is that the time involved is very small and so the microorganisms are always in an oxygen-rich environment. (Where gravity clarifiers are used to settle the activated sludge the dissolved oxygen may be depleted in the floc and some of the more suseeptible microorganisms will die before the recycled sludge is returned to the aeration tanks; however gravity clarifiers can also be used in the present invention). The clear supernatant liquor from the centrifugal decanter or other mechanical concentrator may be the effluent from the purification process in which case the rate of feed of the polluting stream is dependent on the rate of effluent from this machine. If a flotator or gravity clarifier is used after aeration of the mixture the supernatant liquor from the machine is mixed with the feed to the flotator or clarifier (if the machine is a centrifugal decanter then the supernatant liquor will be very well aerated and mixing this with the feed to the flotator or clarifier would be an advantage). The rate of recycle of sludge from the machine is best controlled by proportioning the quantity produced over a given time interval into recycled sludge and waste sludge. The proportion is set by allowing the maximum workable concentration of sludge to build up in the process commensurate with the highest concentration of pollutants that would be expected in the polluting stream. For lesser concentrations of pollutants the microorganism populations are therefore also less and so a reasonably constant treatment effect is realised for a given time of aeration (the time of aeration is fixed by the liquid volume in the apparatus and the rate of feed of the polluting stream). Two more advantages of using a machine to concentrate the microorganisms in the aeration zone are (i) the problem of sludge bulking is reduced or eliminated permitting a much higher ratio of substrate to microorganism concentrations to be tolerated, and (ii) the shear forces encountered by the biological floc in the machine lead to increased oxygen and substrate concentration gradients as with pumping the liquor through air eductors (with a centrifugal decanter considerable aeration of the liquor is also provided). The use of a flocculation aid such as a polyorganoelectrolyte may be necessary when a mechanical concentrator is employed.

In order that the nature of the invention may be better understood one preferred embodiment thereof is hereinafter described, by way of example, with reference to the accompanying diagrammatic drawing (FIG. 1) in which sectional views of aeration and sludge concentration units are shown.

In the apparatus shown in FIG. 1, the polluting stream (P) enters the tank (T) via a constant level header tank (H) and mixes with the aerated liquor (M) containing a high concentration of microorganisms. The liquor (M) is circulated by pump (C) from the bottom central zone of the tank (T) where all, or most, of the air has disengaged itself, through one or more eductors (E) which entrains air (A), into a spiral trajectory inside the tank (T). The partially deoxygenated air and other gasses from biological degradation disengage from the liquor (M) due to buoyancy and centrifugal forces on the bubbles towards and upwards of the central vortex, where they escape to the atmosphere. Foam (F) produced by aeration is dissipated with a spray (S) of liquor (M). A metered portion of the liquor (M) is passed to a centrifugal decanter (D) where a sludge (W) is separated from a supernatant liquor (L) which is the effluent from the process. The sludge (W) has a very high content of microorganisms and for a greater part of the time is recycled back into the tank (T) using a moving conveyor (B). For the remaining part of the time (of a predetermined period) the conveyor (B) direction is reversed towards a container (V) used for carting the waste sludge for disposal by digestion (aerobic or anaerobic), composing, dumping, incinerating or by other means. A further dewatering stage for the wast sludge may be necessary depending on the economics of disposal. It may be advantageous to add a small amount of a high foaming surface active agent to the aeration tank to enhance oxygen transfer from air to liquor if the surface tension of the polluting stream is not already low . Also the addition of a polyelectrolyte to the feed to the decanter may be necessary continuously during operation or only when discharging waste sludge to improve the dewatering and/or flocculating of the sludge. Where the rate of flow of the polluting stream is high it may well be an advantage to have a flotator or gravity clarifier before the centrifugal decanter with the supernatant liquor from the decanter mixed with the feed to the flotator or clarifier (this enables a high flow through the centrifuge otherwise a much larger machine would be required if the supernatant liquor was to be as good as the effluent from the flotator or clarifier).

The two main features of the invention may be used together as in the example described above or may be used separately.

There are a number of advantageous aspects of the invention which are summarised below:

1. The ability to work with a high biomass concentration of between about 10,000 mg/l to 100,000 mg/l in the aeration reactor enables its volume to be kept small or conversely, (a) the organic removal rate per unit of reactor volume can be increased, (b) the sludge age and sludge stability can be increased, or (c) the excess sludge for disposal can be reduced.

2. The high biomass concentration is obtained by mechanical concentration, specifically by centrifugation or by other means such as filtration or ultrafiltration where the sludge is recycled to the aeration reactor or to disposal and the supernatant liquor is the effluent. The mechanical means of concentration may be used in conjunction with a gravity clarifier or flotator such that the thickened biomass from the clarifier or flotator is passed to the mechanical concentrator from which a sludge is produced for recycling to the aeration reactor and to disposal, and the supernatant liquor is recycled back to the clarifier or flotator permitting a smaller or less efficient mechanical concentrator to be used.

3. The prevention of bulking sludge by mechanical concentration thus (a) allowing treatment over a wide range of food to microorganism ratios, (b) producing high quality effluent, (c) allowing higher microorganism concentration in the aeration reactor due to the very low recycle flow rate of concentrated microorganisms in the sludge from the mechanical concentrator, which in addition (d) reduces the size of the gravity clarifier or flotator if this option is used.

4. The production of a dewatered sludge for disposal as excess sludge as being an inherent part of the treatment system thus avoiding the employment of further mechanical concentration equipment to dewater the excess sludge.

5. The maintenance of a healthy sludge recycled back to the aeration reactor by virtue of the very short time the biomass is removed from the aeration zones in its passage through the mechanical concentrator. The dissolved oxygen will remain at a sufficient level in the biomass during the rapid concentration stage to sustain all the life forms present in the biomass.

6. Aeration maintains sufficient dissolved oxygen in the mixture at high biomass concentration, this being effected preferably by the suction of air through venturi eductors with the mixture pumped from the aeration reactor so as to provide intimate contact of air with liquor under pressure to force the mass transfer of oxygen from air to liquor.

7. The reduction of the surface tension of the liquor reduces bubble size and forms foam thus permitting an increased mass transfer rate of oxygen from air to liquor as a result of the increased exposure of the interfacial surface between air and liquor.

8. The tangential delivery of the educted air and liquor to a vortex formed in the aeration reactor permits the separation of bubbles of air from the liquor by centrifugal and gravitational forces into a layer of foam, and also provides efficient mixing and prevention of solids settling in the aeration reactor.

9. The use of a spray of the aerated liquor breaks and controls the foam formed in the aeration reactor and provides further means of oxygen transfer from air to liquor due to the large surface exposed to the air by the spray droplets.

10. Increased oxygen and substrate concentration gradients are experienced by the individual microorganisms as a result of the high rate of shear of the mixture by (a) pumping, (b) by passage through air eductors (c) vortex mixing, (d) by passage through a spray nozzle and (e) by passage through a mechanical concentrator. Where high shear forces exist the biological floc can be disrupted or it disintegrates exposing individual or at least small groups of microorganisms to the oxygen and substrate rich environment surrounding the floc.

11. The rate of treatment is increased by the utilisation of the energy expended as heat in the pumping, eduction, vortex mixing, spraying and other frictional losses to the liquid and from the excess energy of biological activity particularly for high biomass concentration. Because of efficient mass transfer of oxygen from the air little heat is lost through evaporation. Insulation of the system is preferably provided.

12. Filtration and particularly ultrafiltration as a means of polishing effluent from the system (a) improves the quality of the effluent, (b) recycles the concentrate back into the aeration reactor further increasing the concentration of the biomass, particularly in the form of free swimming microorganisms.

We claim:

1. Apparatus for the aerobic biological purification of liquid wastes containing organic pollutants comprising a tank containing a liquid having a high biomass concentration, means to introduce a liquid to be purified into said tank, pump means arranged to withdraw liquid from near the bottom of said tank, a fluid flow connection from said pump means to eductor means arranged to entrain air into said liquid, means to introduce said aerated liquid into said tank to cause a rapid circulatory movement of liquid in said tank and to produce a vortex at the surface thereof, spray means connected to the output of said pump to spray liquid onto said vortex, liquid metering means arranged to feed a predetermined proportion of said liquid to mechanical separating means arranged to separate out sludge from said liquid and capable of separating and concentrating the sludge to a concentration sufficiently high so that the concentrated sludge can be used to maintain the high biomass concentration in the tanks and means for introducing a proportion of said separated sludge directly into said tank.

2. Apparatus as claimed in claim 1 wherein said mechanical separating means is a centrifugal decanter.

3. Apparatus as claimed in claim 1 wherein a flotator or gravity clarifier is arranged before said mechanical separating means.

4. The method for the aerobic biological purification of liquid wastes containing organic pollutants comprising:
 (a) introducing the liquid waste into a tank containing a liquid having a high predetermined biomass concentration;
 (b) withdrawing liquid from the tank and entraining air into the withdrawn liquid;
 (c) introducing the liquid with the entrained air into the tank in a manner so as to cause the liquid in the tank to circulate and produce a vortex at the surface of and a foam on the surface of the liquid in the tank to thereby oxygenate the liquid in the tank;
 (d) maintaining the height of the foam at a predetermined level by withdrawing liquid from the tank and spraying a portion of the withdrawn liquid on to the surface of the foam;
 (e) separating and concentrating the sludge therefrom by a mechanical separation device capable of producing a sludge of sufficiently high concentration to carry out step (f); and
 (f) recycling a portion of said concentrated sludge to the tank at a rate so as to maintain the biomass concentration within the tank at the pedetermined level.

5. A process as claimed in claim 4 wherein the biomass concentration in said tank is maintained at between about 10,000 mg/l and 100,000 mg/l.

6. A process as claimed in claim 4 wherein a small quantity of a high foaming surface active agent is added to the contents of said tank.

* * * * *